June 7, 1966  F. E. BUSCHBOM  3,254,798
BUNK FEEDER OR THE LIKE
Filed June 8, 1962  8 Sheets-Sheet 1

INVENTOR.
FLOYD E. BUSCHBOM
BY
Moore, White & Bund
ATTORNEYS

June 7, 1966   F. E. BUSCHBOM   3,254,798
BUNK FEEDER OR THE LIKE
Filed June 8, 1962   8 Sheets-Sheet 3

INVENTOR.
FLOYD E. BUSCHBOM
BY Moore, White & Burd
ATTORNEYS

June 7, 1966  F. E. BUSCHBOM  3,254,798
BUNK FEEDER OR THE LIKE
Filed June 8, 1962  8 Sheets-Sheet 5

INVENTOR.
FLOYD E. BUSCHBOM
BY
Moore, White & Bud
ATTORNEYS

June 7, 1966  F. E. BUSCHBOM  3,254,798
BUNK FEEDER OR THE LIKE

Filed June 8, 1962  8 Sheets-Sheet 6

INVENTOR.
FLOYD E. BUSCHBOM
BY
*Moore, White & Burd*
ATTORNEYS

INVENTOR.
FLOYD E. BUSCHBOM
BY
Moore, White & Dud
ATTORNEYS

United States Patent Office 3,254,798
Patented June 7, 1966

3,254,798
BUNK FEEDER OR THE LIKE
Floyd E. Buschbom, Long Lake, Minn., assignor to Vandale Corporation, Long Lake, Minn., a corporation of Minnesota
Filed June 8, 1962, Ser. No. 201,052
38 Claims. (Cl. 222—59)

This invention relates to new and useful improvements in bunk feeders or the like of the type which includes means for receiving ensilage, haylage, mixed feeds, grain supplements, etc., usually from a silo or other appropriate storage bin, and means for conveying the material received into extended position within a feed bunk whereby it is accessible to animals, usually cattle.

It is an object of this invention to provide a new and useful bunk feeder or the like providing functional features superior to existing bunk feeders.

A further object of this invention is to provide a new and useful bunk feeder or the like which will feed an entire herd at one time.

A further object of this invention is to provide a new and useful bunk feeder or the like which will eliminate animal crowding which occurs when feed is delivered to a portion of the feed bunk first.

A further object of this invention is to provide a new and useful bunk feeder or the like which will permit selective dual lot feeding.

A still further object of this invention is to provide a new and useful bunk feeder or the like which will feed a mixture of ensilage, grain, haylage, mixed feed or the like uniformly throughout the length of the feeder and without substantial separation.

Still a further object of this invention is to provide a new and useful feeder of improved performance and including an auger having an enclosure for all weather protection of the auger, and for prevention of engagement with the animals being fed during operation.

Still a further object of this invention is to provide a higher capacity output and lower power requirements for a bunk feeder or the like.

Still a further object of this invention is to provide a new and useful bunk feeder or the like having means for accurately measuring feed by volume.

Yet a further object of this invention is to provide a new and useful bunk feeder which eliminates wind waste during feed delivery to the bunk.

Still a further object of this invention is to provide a new and useful bunk feeder or the like which has eliminated the side delivery openings of tube or trough type feeders and therefore precludes injury, especially lacerated tongues, to livestock through these openings.

Yet a further object of this invention is to provide a new and useful bunk feeder which may be completely emptied after each feeding and in which there is no residue left to compact or freeze and immobilize the auger.

Other objects of this invention reside in the provision of an economical new and useful bunk feeder or the like of increased capacity, which will feed mixed feed, silage or hay to livestock quicker, the provision of a bunk feeder or the like including a helical auger positioned within an enclosure hood and supported by a portion of the hood without bearings, the supporting portion having means for reducing wear thereof, and in the provision of a removable closure for the bottom portion of the hood and means for operating the same in response to conveying of material.

Still further objects reside in the utilization of a diverter or tiltboard in cooperation therewith.

Still further objects of the invention reside in the specific structural details and construction of the hopper, hood, removable wear plate for the hood, the cooperating auger supported by the removable wear plate, the closure means, the supporting and operating structure for the closure means, the pressure sensitive switch, the diverter board, the actuating mechanism for the closure means in cooperation with the drive for the auger, and in the structural and functional cooperation of these parts.

Other objects of the invention are those inherent in apparatus as described, pictured and claimed and will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings in which correspondng numerals refer to the same parts and in which.

Figures 1, 8:
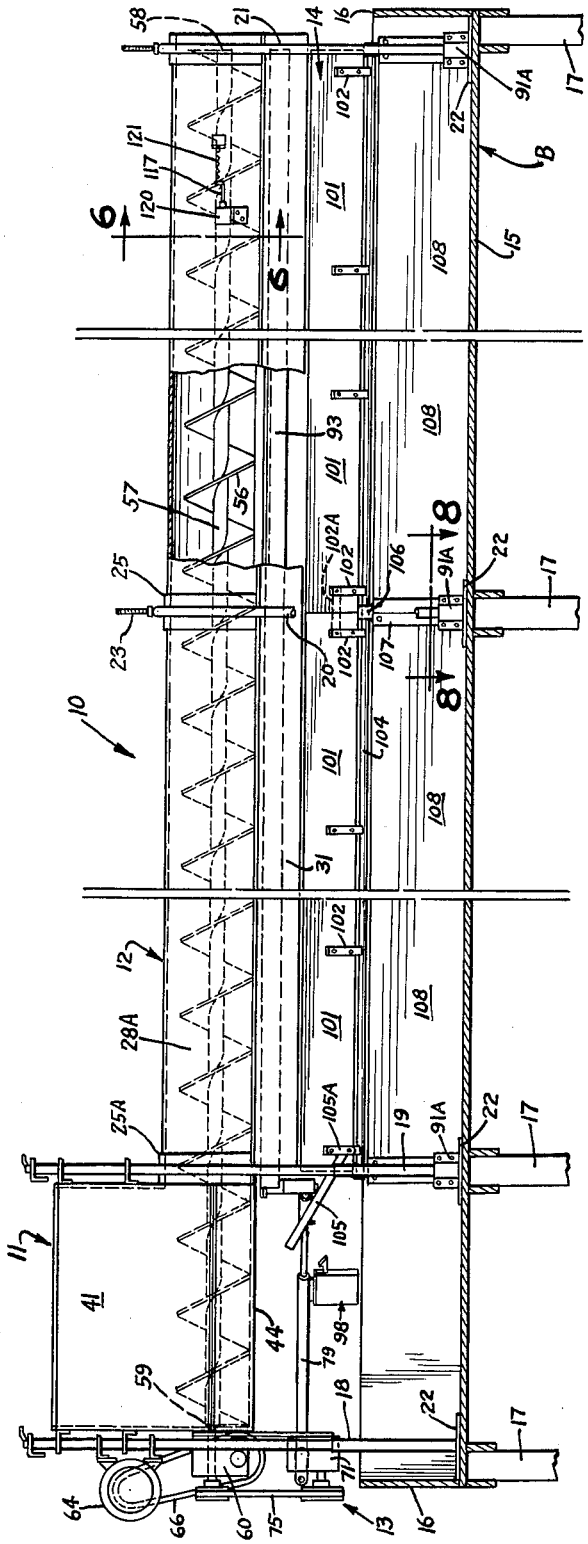
FIGURE 1 is a side elevational view, partly broken away, of the invention installed in a feed bunk, the feed bunk having the closer side rail removed, and being shown in fragmentary form.
FIGURE 8 is a sectional view taken along the line and in the direction of the arrows 8—8 of FIGURE 1.

Reference is now made to the drawings and specifically to FIGURE 1. There is shown the bunk feeder or the like of this invention generally designated 10, including the following generally designated components: the hopper assembly 11, the conveyor assembly 12, the drive assembly 13 and the tiltboard assembly 14. All of these are positioned in the bunk B which is supported by a plurality of legs 17 secured to and supporting a floor or base 15 having a peripheral wall 16, the nearest portion of which is removed for illustration. The bunk B is usually made of wood, although it may be constructed partially or completely of concrete, steel or the like, as desired. The entire feeder 10 is supported on a plurality of support stands 18–21, each of which provides a pair of legs having flat foot plates or flanges 22 which are bolted or otherwise secured to and which rest on and are supported by the floor 15 of the bunk.

Figure 2:
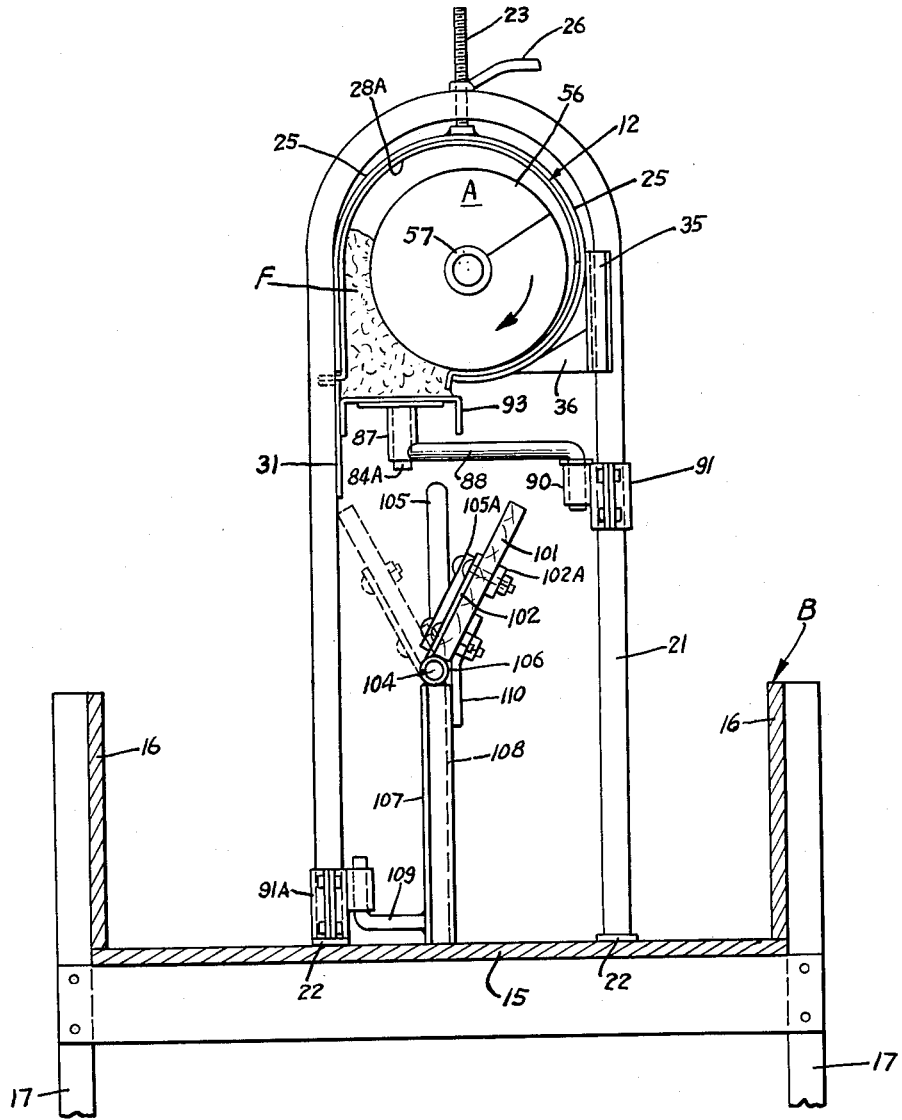
FIGURE 2 is an enlarged right end elevational view with the hopper drive structure, and pressure switch removed.

Each of the stands 20–21 is identical, comprising a pair of spaced parallel tubular legs interposed by a semi-circular portion integral therewith as shown in FIGURE 2. They are thus of inverted U-configuration and formed from a tubular or pipe member, as shown. Each is apertured at the bend in the U to receive a threaded bolt or adjusting rod 23 having its head welded or otherwise secured to a hanger bracket and carry over plate 25 of the form shown in FIGURE 3. A handle 26 has an apertured end providing a nut which is threaded onto member 23, all as will be seen by reference to FIGURES 2 and 3. By turning the handle 26 the rod 23 may be raised or lowered with respect to the U portion of member 20 and thus the entire tube assembly 12 elevated or lowered by turning all of the handles substantially uniformly.

Figure 3:
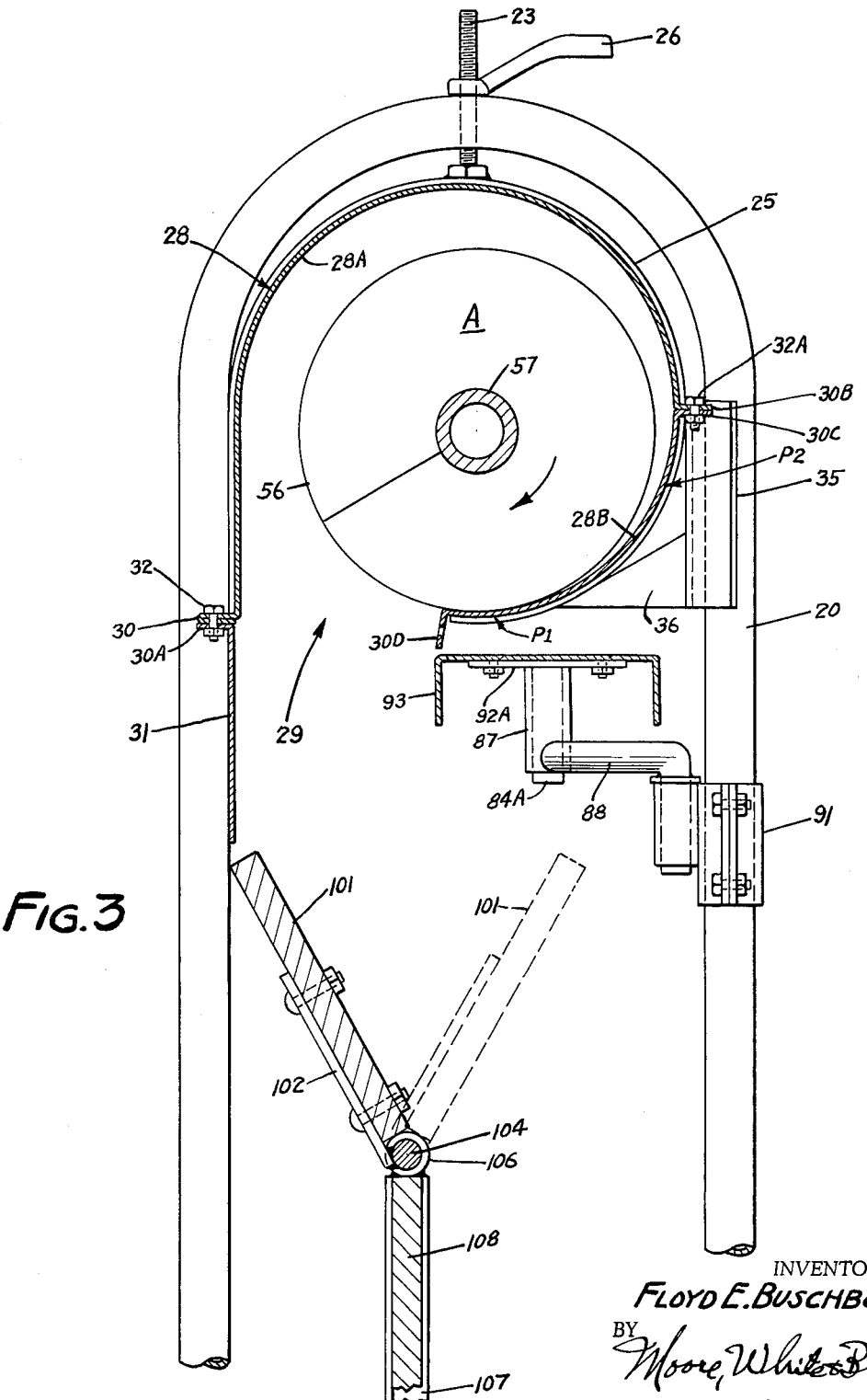
FIGURE 3 is an enlarged fragmentary vertical sectional view of the feeder of this invention showing the feeder in position for dropping feed.

The conveyor assembly 12 includes an elongated housing shroud or hood 28 which is formed of three parts, upper cover 28A, a reversible bottom wall or wear plate 28B, and curtain wall plate or member 31. Members 28A and 28B and 31 are formed of suitable gauge sheet metal and when assembled form an inverted J in cross-section with an elongated aperture or slot at 29. Member 28A is hemmed as shown in FIGURE 3 at 30 to provide an outwardly turned flange, to which is secured the outwardly turned flange 30A of curtain wall plate or member 31. The other edge of member 28A is bent to provide an outwardly turned flange 30B to which is secured one outwardly turned flange 30C of member 28B. Member 28B comprises an elongated member having a cross-section in the form of an arc of a circle with two outwardly turned parallel flanges 30C and 30D at the edges of the arc being uniform so that if there is wear due to the abrasive action of the auger A thereagainst at the portion indicated by P1, the member 28B may be turned end-for-end or reversed whereupon portion P2 would then be positioned under auger A for support. While flange 30 is shown as hemmed to provide a double fold, the flanges at 30A–30D are shown as single fold, although they may be hemmed to provide additional strength, if desired. Each of the outwardly turned flanges 30B–30D and 30–30A is provided with a plurality of aligned apertures so that curtain plate 31 may be bolted to member 28A by a plurality of bolt assemblies 32 and hood cover 28A may be bolted to wear plate 28B by a plurality of bolt assemblies 32A. Apertures in flanges 30C and 30D correspond to the apertures in flange 30B so that when the wear plate 28B is reversed the other flange (in this instance 30D) may be bolted to flange 30B.

Each of the flanges 30–30D have portions removed adjacent the ends thereof to accommodate the plate 25 which overlaps the butted juncture of adjacent sections of hood 28 of the tube assembly 12 as shown in FIGURE 1 and is bolted or otherwise suitably secured thereto at each side of the butt.

Thus, the entire bunk feeder assembly is comprised of a hopper and drive assembly and added on conveyor sections, each including hood, auger and closure, and tiltboard and diverter board sections, if desired, as will become more apparent as further described. While only one conveyor section may be used, additional sections of uniform or varying length are usually used to provide the desired extension.

In this fashion the conveyor assembly tube or hood 28 comprises a plurality of sections, each section formed of the three members 28A, 28B and 31, all bolted together and each section being abutted by at least one end to an adjoining section, or to the hopper assembly 11, and positioned in abutment by the overlapping reinforcing plate 25 bolted thereto. Plate 25 has welded to it throughout the portion designed to support the wear plate 28B, a guide member 35 in a form of a section of angle which is adapted to abut against and ride up and down the adjacent leg of stand 21. A gusset 36 serves to support in position the bottom end of member 25 and is welded to member 35 as shown in FIGURES 2 and 3.

Figure 4:
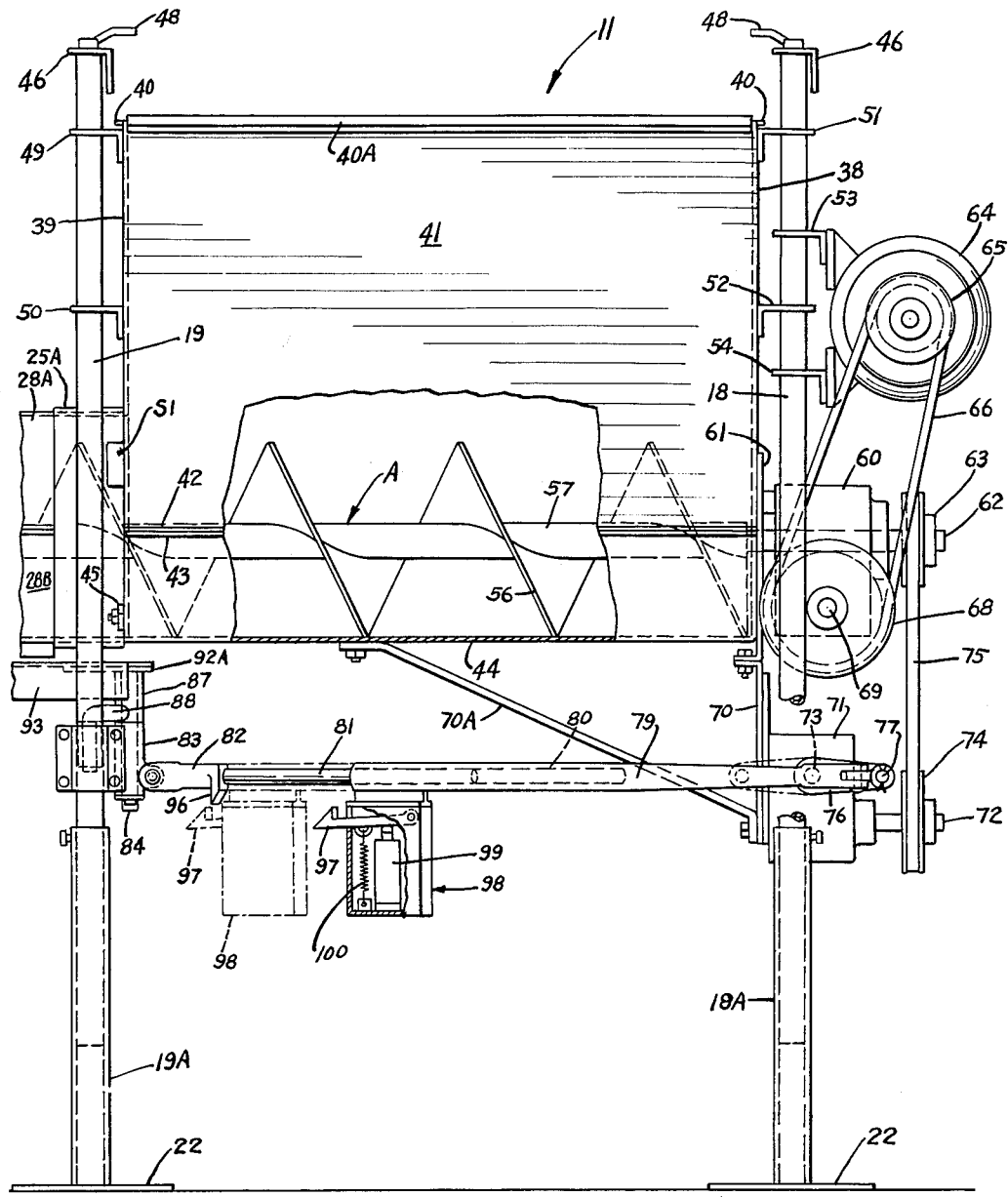
FIGURE 4 is a fragmentary elevational view, partly broken away, showing the actuation means for the auger and closure.

The hopper generally designated 11 has a sheet metal front plate 38, a sheet metal back plate 39, each of generally inverted triangular configuration and having an outwardly flanged top edge 40 and a semicircular portion cut out at the downwardly turned apex of the triangle. Side panels 41 are joined thereto by being bolted along inwardly turned flanged edges and are provided with similarly outwardly turned top flanges or edges 40A and outwardly turned bottom flanges 42. Outwardly turned bottom flanges 42 cooperate with the outwardly turned flanges 43 of hopper bottom member 44 and are bolted thereto so that bottom member 44, a semicircular closure trough member, forms a bottom for the hopper 11. Member 44 extends beyond end 39 of the hopper 11 and terminates in the middle of plate 25A, as shown in FIGURE 4, abutting up against the bottom of the first wear plate 28B to form a continuation thereof. Thus, it will be apparent that the auger A is supported in its entirety by a plurality of wear plates 28B and by cooperating trough 44 engaging a plurality of arcuate radial portions of the auger at spaced positions. Member 25A is similar to member 25 except that it is provided with a plurality of ears 45 which are bolted to plate 39 to fix it firmly to the hopper 11.

Hopper 11 is supported on stands 18 and 19 which are similar to stands 20 and 21 except that in lieu of having rounded tops they are provided with transverse cross angles 46 which are welded or otherwise secured to the top ends of the vertical tubular legs. Plate 39 of hopper 11 has bolted or otherwise secured thereto a pair of angles 49 and 50. A threaded rod 47A penetrates angle 49 and angle 46 of stand 18 and is secured for adjustment of the hopper upwardly and downwardly. It is welded or secured at one end to handle 48, passes through an aperture in angle 49 and through a nut secured to the underside thereof. Handle 48 engages the top surface of angle 46, as shown.

Angles 49 and 50 are appropriately apertured so that the vertical legs of stand 18 may pass through them, so that angles 49 and 50 may slide vertically on these legs. Additional vertical adjustment of stands 18 and 19 and thus of hopper 11 is provided by telescoping sleeves 18A and 19A in which the legs of hangers 18 and 19 fit and which are secured thereto by set screws so that the legs of hangers 18 and 19 may be adjusted upwardly or downwardly in the telescoping members 18A and 19A and then locked in position. In this instance foot plates or flanges 22 are secured to the bottom ends of sleeves 18A and 19A whereas they are secured to the bottoms of the tubular legs for stands 20 and 21.

Wall 38 is provided with a pair of angle members 51 and 52, in similar fashion to angles 49 and 50 for wall 39. Another threaded rod 47A is welded at one end to handle 48 which engages the top surface of angle member 46 of hanger 19. Angle 51 is appropriately apertured for the penetration of rod 57A and rod 47A penetrates a nut secured to the underside thereof in the same fashion as described for hanger 18 and wall 39. Angles 51 and 52 are appropriately apertured for the penetration of the vertical legs of hanger 19. Another pair of angles 53 and 54 are apertured and positioned on the legs of hanger 19 and serve as a motor base. Angles 53 and 54 are each turned in the opposite direction from angles 50 and 51 to provide an outwardly turned flat surface having an elongated slot in which the base of the motor 64 is bolted.

As will be apparent, the angles 53 and 54 are appropriately apertured for the passage of the legs of hanger 19 and adjustable upwardly and downwardly vertically thereon. Angles 53 and 54 are maintained in spaced relation by being fixedly secured to the motor. Angle 53 has a pair of threaded rods 55 each welded or otherwise secured at one end thereto and penetrating appropriate apertures in angle 51. It is immobilized in vertical adjustment with respect to angle 51 by pairs of nuts positioned one each above and below the flange of angle 51.

Thus the motor 64 is suitably positioned to maintain belt tension of belt 66 by vertical adjustment of rods 55 with respect to angle 51, permitted by the sliding of angles 53 and 54 on the legs of stand 19. Once adjusted the motor will then move upwardly or downwardly with the hopper assembly 11 as it is vertically adjusted by handles 48 and rods 47A in unison with handles 26 and rods 23 for the conveyor assembly 12. Additional vertical adjustment of the hopper assembly 11 is provided by sleeves 18A and 19A as described.

The material conveying unit, auger or helical flight means A supported by the wear plates 28B and hopper bottom 44, comprises a plurality of auger sections each comprising a helical flight 56 secured to a tubular center shaft 57. Adjacent sections are abutted together and joined in any suitable manner such as by having adjoining ends of shaft 57 sleeved over a common stub shaft or rod and pinned thereto, or otherwise. Auger A is provided with a distal terminal end 58 and a proximal terminal end 59, as shown in FIGURE 1. End 59 has one end of output shaft 62 of a gear box or transmission 60 positioned therein and pinned or otherwise secured thereto so that the auger A is rotated by the gear box or transmission 60.

Box 60, as perhaps shown best in FIGURE 4, is bolted or otherwise fixed upon a flat plate 61 which is bolted or otherwise attached to wall 38 and serves as a closure for the semicircular cut-out portion in plate 38 and for the respective open end of member 44. Box 60 has the shaft 62 extending from both ends thereof, one end being secured to the hollow shaft 57 of auger A as previously described and the other end being provided with sheave 63. Motor 64 has a shaft which drives sheave 65 and through a belt 66 drives sheave 68 which is secured to and in turn drives the input shaft 69 of gear box 60. Thus, running of the motor 64 drives the input shaft 69 and, through an appropriate worm and worm gear in transmission 60, the output shaft 62 for the rotation of the auger A, and, through sheave 63, of other apparatus presently described.

It will be appreciated that up to this point there has been described a bunk feeder of new and unique construction and function which will operate quite satisfactorily to deliver feed to animals. However, the apparatus subsequently to be described is in the nature of attachments forming an improved combination with additional and meritorious functional features.

Plate 61 has an inwardly turned bottom flange which is bolted the corresponding inwardly turned top flange on a plate 70 which supports a second gear box or transmission 71, which is bolted thereto in vertical slots. Plate 70 is braced to member 44 by brace 70A, bolted or otherwise secured. Transmission 71 has an input shaft 72 and an output shaft 73, driven through an appropriate worm and worm gear. Shaft 72 is driven by the sheave 74 from belt 75, and in turn driven by sheave 63 as previously explained.

Figure 5:
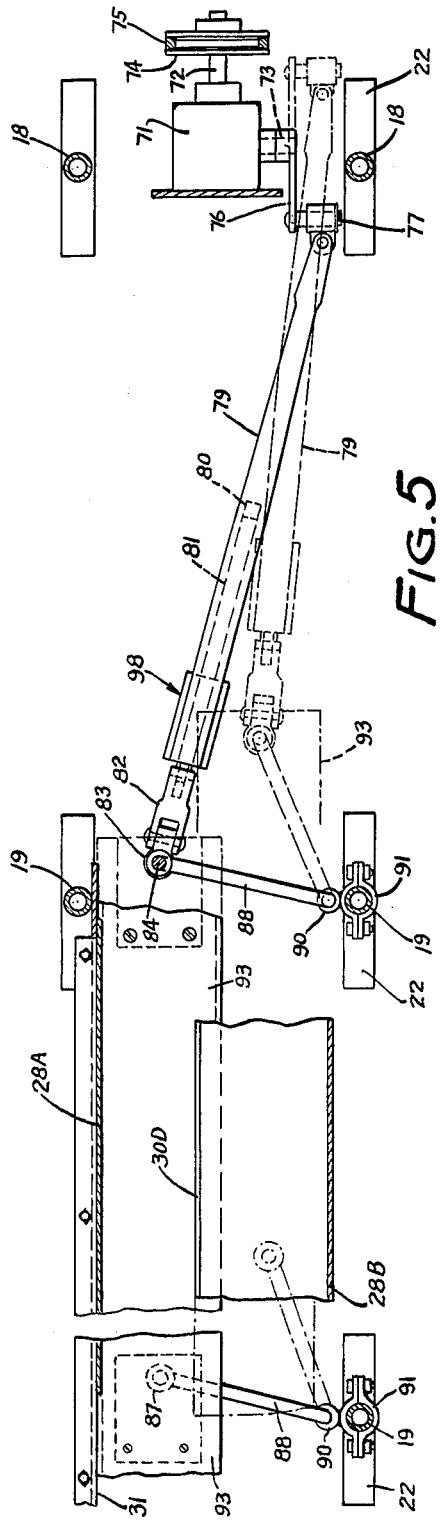
FIGURE 5 is a fragmentary plan view with certain parts omitted showing the closure means drive connection, and operation.

To shaft 73 is secured a crank 76 for rotation therewith. Crank 76 has a pin 77 on which is sleeved a sleeve member 78, retained in position by a washer and cotter key for pivotal movement thereon, and having an apertured tongue which receives a pin or bolt assembly securing the bifurcated end of pitman arm 79 for pivotal movement thereto as shown in FIGURE 5. Pitman arm 79 is tubular or provided with a central recess at 80 which has an inside diameter slightly larger than the outside diameter of a rod 81 which is slip fitted therein for reciprocation as shown in FIGURE 5. Rod 81 has secured to its extending end a bifurcated member 82 secured for pivotal movement by a pin or bolt assembly to the tongue of sleeve 83 positioned for pivotal movement on shaft 84 and retained thereon by a washer and cotter key assembly 85. A second sleeve 87 secured to an arm 88 (FIGURES 4 and 5) is also positioned on shaft 84 and has a downturned end 89 supported for arcuate movement by sleeve 90 of bracket assembly 91. Bracket assembly 91 is made into hemimorphic portions and adapted to be positioned around one of the legs of stand 18, and bolted thereto. End 89 may have a washer secured thereto or an enlarged portion resting on the top face of sleeve 90 as desired.

Shaft 84 is secured to a plate member 92, in turn bolted or secured to the underside of a gate or closure member 93. Closure member 93 is an elongated rectangular plate member having downwardly turned edges which may be hemmed for additional strength as desired. Plate member 92 is bolted thereto and flush with one end, as shown in FIGURE 3. A plurality of members 93 are usually provided, one for each section of hood and auger since a plurality of hood and auger sections is usually used, as previously described. Plates 93 are then positioned end-to-end and in abutment and supported by plates 92A being positioned to underlay each of the abutting ends. Since there is no abutment for the first and last members 93, plate 92 at the hopper end, and plate 92A at the distal end (of the closure means formed by the plurality of members 93 in end-to-end relation) are each placed flush with the edge of their respective members 93.

Plates 92A are each provided with a shorter shaft 84A as shown for plate 92A in FIGURE 3, than plate 92 since the shaft 84A does not need to penetrate sleeve 83 as does shaft 84 of plate 92 when it is connected to the pitman. Both plates 92 and 92A are supported by arms 88 and brackets 91.

Figure 12:
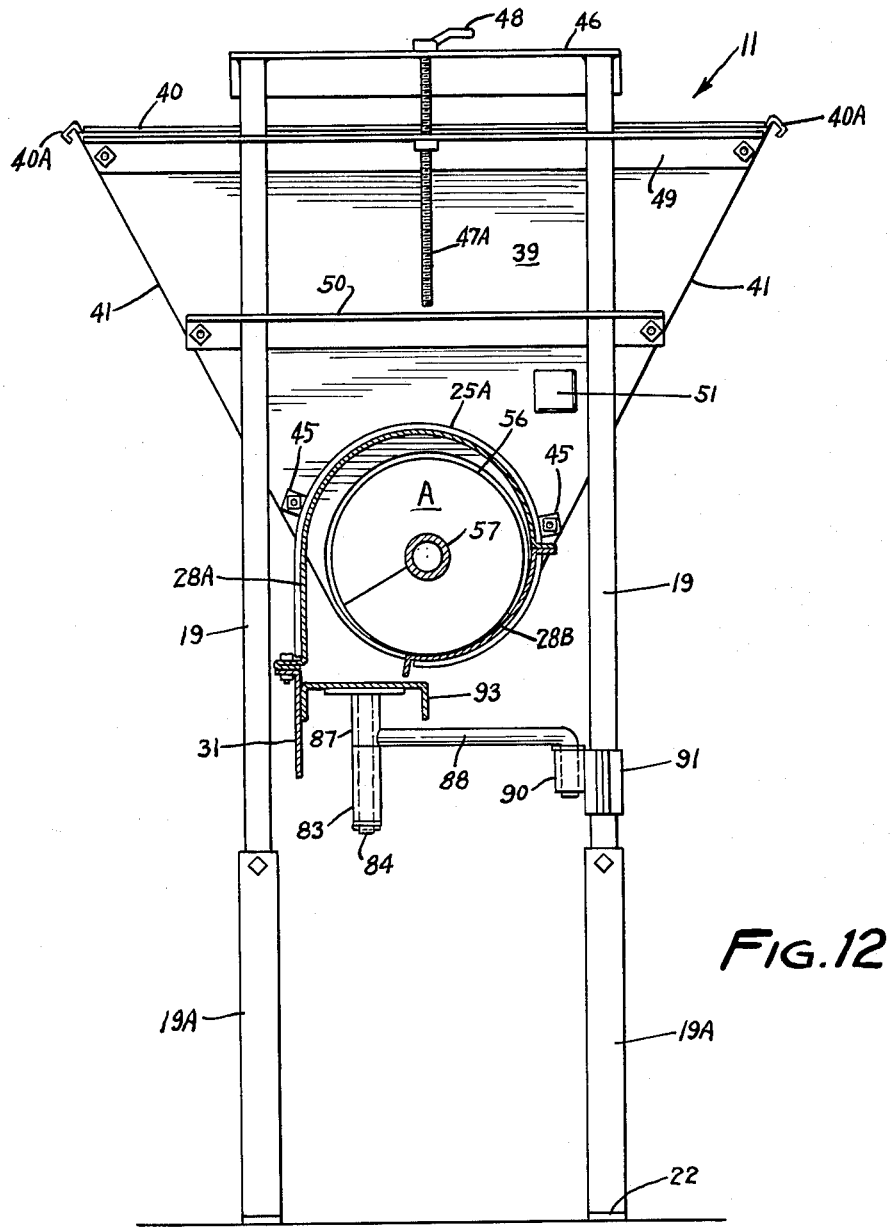
FIGURE 12 is an opposite end view thereof.

As shown in FIGURE 5 a plurality of arms 88 movably support the closure member 93 below the elongated discharge opening defined by the side wall or hood cover 28a and the wear plate 28b. The closure member 93 is shown in a closed position indicated in full lines below the elongated opening and in an open position indicated in broken lines away from the elongated opening. The closure member 93 moves in a common horizontal plane about a plurality of upright axes generally coincident with the upright axes of the sleeves 90 accommodating the downwardly projected ends of the arms 88. FIGURES 2 and 12 show the separate arms 88 pivotally mounting the opposite ends of the gate 93. The number of arms 88 used to pivotally support the closure member 93 is dependent on the length of the bunk feeder.

As will be seen in FIGURE 4, member 82 has provided integral with it a depending inclined lug means 96 adapted to be engaged by a tongue 97 of the configuration shown in FIGURE 4. Tongue 97 protrudes from a solenoid assembly 98 supported on the underside of arm 79. Solenoid assembly 98 is provided with a conventional solenoid coil 99 for urging member 97 upwardly against the bias of a spring 100, all as shown in FIGURE 4.

A toggle switch S1 is positioned on wall 39 and is connected to solenoid 99 for continuous actuation thereof, if desired, as later explained.

The tiltboard assembly is perhaps best illustrated in FIGURES 1, 2, 3 and 8. It comprises a plurality of tiltboard sections 101 each bolted to a bracket strap 102, usually two straps being used for each board. Adjacent straps at abutting ends of boards 101 are joined by straps 102A so that all boards tilt in unison. Straps 102 are each welded at one end to tubular rod 104. Board 101 adjacent end 69 is provided with a handle 105, as shown in FIGURE 1, and either an opposite male or female end. Handle 105 has a tubular portion joined at one end to a flat piece 105A, at an angle, piece 105A being bolted to the first bracket strap 102. Rods 104 are straight and each has a short protruding shaft welded in one end to make one male and one female end for positioning in cooperating prolongation and are received in a plurality of sleeves 106 each supported at the top of a divider board bracket 107 which also serves to support adjacent ends of the divider boards 108 which are positioned in abutment and prolongation as shown in FIGURES 1 and 8. Rods 104 are so chosen that when in the assembled position of FIGURE 1, abutting ends are received within sleeves 106. Bracket 107 is bolted to the ends of boards 108. Bracket 107 comprises a T member secured at its bottom end to a rod or pipe 109 which has an upturned end received in the sleeve of a securing bracket assembly 91A. Assembly 91A for bracket 107 is bolted to clamp on one of the tubular legs of stands 19–21, and adjacent foot 22, but otherwise similarly to bracket 91 for arms 88.

Boards 101 are limited in movement in one direction by engagement with the legs of stands 20 and 21 as shown in dotted lines in FIGURE 3, and in the other direction by bent clip 110, bolted to one of straps 102 and having a portion bent to engage board 108, as shown in full lines in FIGURE 3. Usually one member 110 is provided for each board 101.

Figure 6:
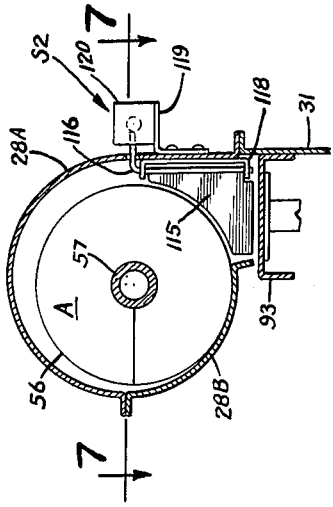
FIGURE 6 is a view taken along the line and in the direction of the arrows 6—6 of FIGURE 1.
Figure 7:
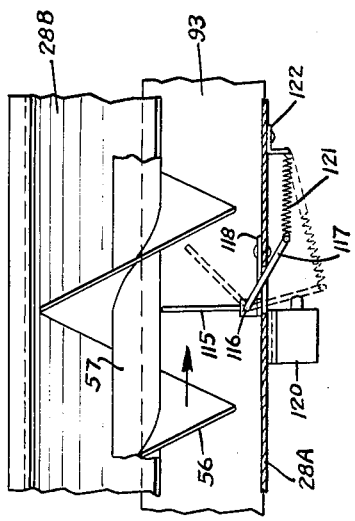
FIGURE 7 is a sectional view taken along the line and in the direction of the arrows 7—7 of FIGURE 6.

The pressure switch assembly S2 is best shown in FIGURES 6 and 7. There is shown an actuator 115 of the configuration shown in FIGURE 7, positioned within the hood cover 28A, and secured to a rod 116 having a bent end 117 extending through an elongated aperture in plate 28A. Arm 116 is supported in a U bracket 118 bolted or otherwise secured to the inside wall of member 28A. Positioned on the outside wall by bracket 119 is a microswitch 120 whose actuator is adapted to be engaged by the bent end 117 of rod 116 as shown in FIGURE 7. A spring 121 is connected to a bracket 122 also bolted to member 28A to retain the pressure switch actuator 115 in the full line position of FIGURE 7.

Figure 9:
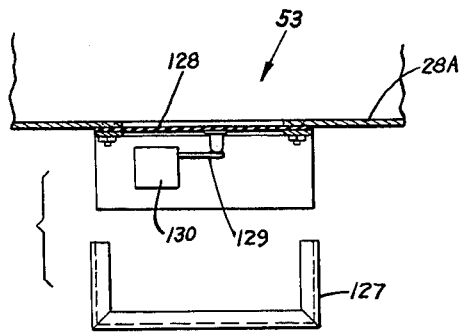
FIGURE 9 is a plan view of a modified form of pressure switch with the cover separated.
Figure 10:
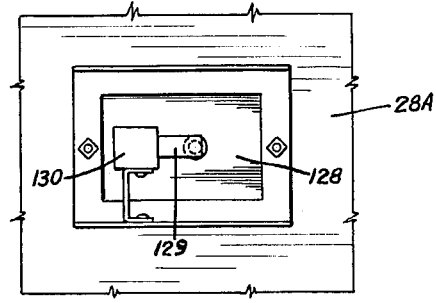
FIGURE 10 is an end view of a portion thereof.

An alternate form of pressure switch S3 is shown in FIGURES 9 and 10. There the pressure switch S3 is shown as bolted to cover a rectangular opening in member 28A. It is provided with a first U shaped portion designated 126 providing a bottom and extending sides and a second U shaped cooperating cover portion 127 having inwardly turned flanges formed to overlap the parallel side portions of member 126 and bolted or otherwise secured thereto to provide a complete housing for switch S2. The bottom of member 126 is provided with a rectangular aperture which is covered by a cemented or otherwise secured thin membrane 128 of rubber, plastic, etc., which is engaged by the actuator 129 of a microswitch 130 secured to member 126. Member 127 merely serves to enclose the entire apparatus. Either of switches S2 or S3 may be positioned adjacent the end 58 of the feeder as shown for switch S2 in FIGURE 1. As placed, they are positioned sufficiently far inward from end 58 of the feeder so as to control the opening of plates 93 before any appreciable amount of feed is conveyed from the end 58 by auger A.

Figure 13:
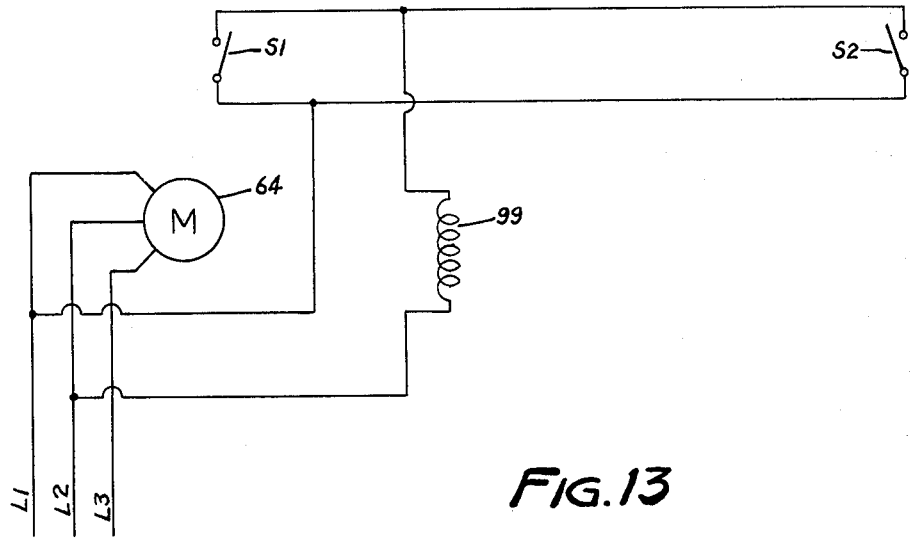
FIGURE 13 is a schematic wiring diagram.
Figure 11:
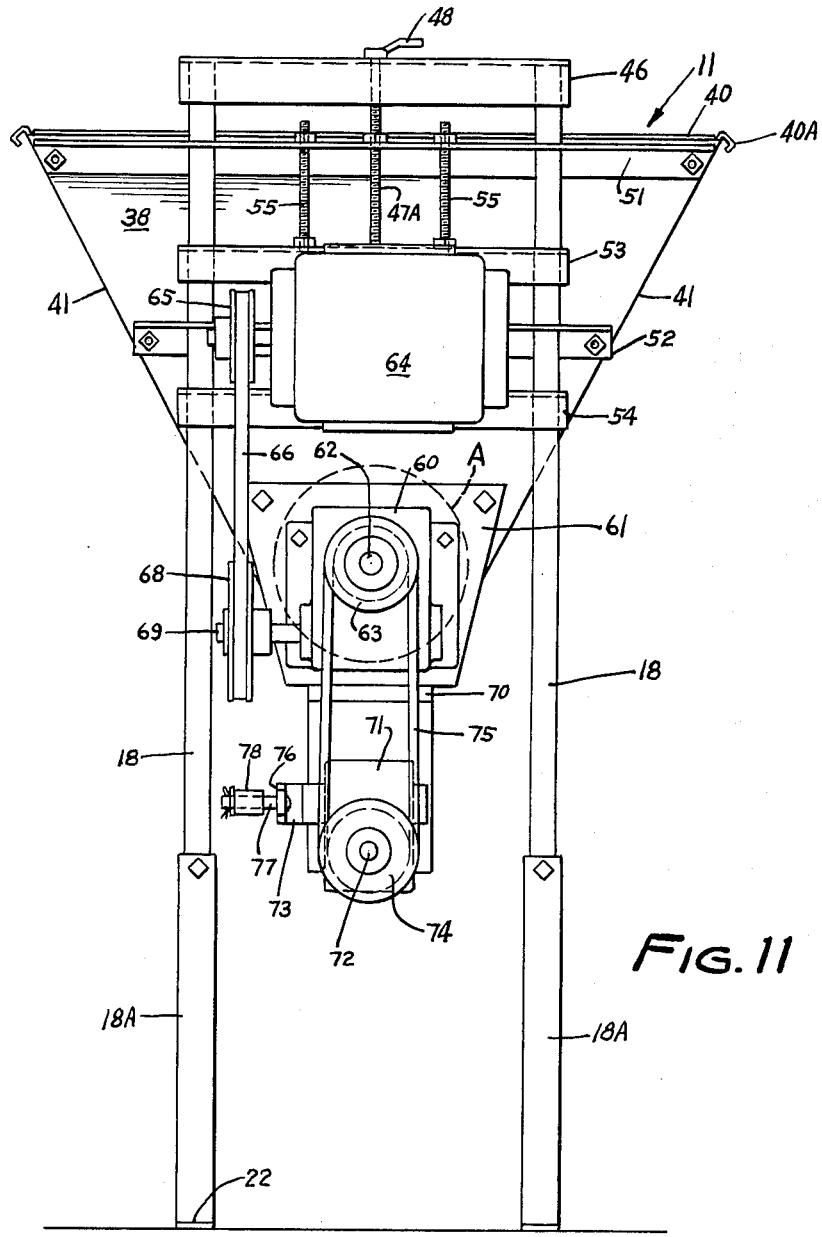
FIGURE 11 is an end view of the hopper assembly.

The wiring diagram, FIGURE 13, shows the interconnection of switches S1 and S2 (or S3). There motor 64 is shown connected to electric lines L1, L2 and L3 for operation. An appropriate disconnect or motor starter switch is used, not shown, and energizes the entire circuit. Lines L1 and L2 are connected to switches S1 and S2 (or S3) so that when either is closed solenoid 99 is actuated, as long as either is closed.

It will be apparent by reference to FIGURE 2 that the auger A is rotated in a direction to roll up the arcuate incline provided by the arcuate wear plates 28B, or clockwise with reference to FIGURE 3. Cover 28A and plate 28B provide in cross-section, a circle for the major portion of their combined peripheries. The article is terminated at flange 30D and by a portion of cover 28A providing a straight edge portion joined to the curtain wall 31. The straight edge portion commences at a point substantially on a horizontal plane passed through the axis of auger A as seen by reference to FIGURE 2. The axis of auger A is offset downwardly and rightwardly with reference to the axis of the circular formed by portions 28A and 28B so that wear plate 28B cradles the auger as shown. The straight portion of cover 28A terminates in spaced relation to flange 30D to provide the opening 29.

Hence, there is a gradually increasing clearance between the circumference of auger A and the circle formed by members 28A and 28B, the clearance gradually increasing upwardly in a counter-clockwise direction as shown in FIGURE 2. The edge of wear plate 28B at flange 30D is positioned at slightly past a vertical plane passed through the axis of the circle to cradle the auger A when it is in the position shown. In other words, that edge of the wear plate (as at 30D) is positioned at one side also of a vertical plane passed through the axis of auger A when it is at rest position, but immediately adjacent that plane. The increasing clearance provided not only allows for give or freedom of the auger within the housing 28 when bunches of material or other obstructions are encountered, but also provides a space, chamber or reservoir, occupied by the material F for carrying of material over plates 93 as shown in FIGURE 2. Thus the space provides a trough of the cross-sectional configuration shown.

The bunk feeder of this invention may be operated in three fashions. In operation as a standard "carry over" type bunk feeder the sheave 63, belt 75, gear box 71, the connections to and closure members 93 are not utilized, nor is the tilt or diverter board assembly 14 used. In this fashion the motor 64 drives sheave 65 which through belt 66 drives sheave 68 and shaft 69, which through gear box 60 drives the auger A in the direction shown in FIGURE 2, building up the material within the hood 28 as shown by the material F in that figure. The material, as can be visualized from FIGURE 1, is brought into the hopper 11, conveyed out of the hopper by the auger A into the sections of the feeder proper. As it is conveyed from the left end to the right end with reference to FIGURE 1, it commences to drop through the elongated aperture or slot 29 building up as a pile on the floor of the bunk B. As the auger continues to rotate the length of the pile continuously extends and the material is conveyed by carrying over upon itself, i.e., the pile of material itself acts as a closure for the portion of the bunk feeder over that portion of the bunk to which the material has already been delivered and the feed progresses from the left to the right with reference to FIGURE 1. In this instance the pressure switch assembly S2 (or S3) is not used, the feed is delivered to the end of the bunk and the motor is then de-activated. A saving is effected by omitting the un-used parts.

When it is desired to feed animals simultaneously and to achieve a number of the other objects of this invention, the pressure switch S2 (or S3) and plates 93 for closing slot 29 are used, providing an intermittent dumping of the feed material F. In this instance belt 75 through gear box 71 continuously actuates the crank 76 which continually reciprocates pitman arm 79 from the full to the dotted line position of FIGURE 5. However, arm 88 is not moved from the full to the dotted line position until member 97 engages member 96 (FIGURE 4) so the closure plates 93 are normally positioned as shown in FIGURE 2, to close the slot 29 and the material builds up as shown by F in FIGURE 2 by operation of the auger A and is carried over the plates 93 by the auger A. When the material F engages arm 115 of pressure switch assembly S2, arm 115 is moved from the full to the dotted line position of FIGURE 7, stretching the spring 122 from the full to the dotted line position and engaging the actuator of microswitch 120. The spring 121, as will be apparent, normally maintains the plate or arm 115 in the path of the flow of material F. Energization of microswitch 120 energizes solenoid 99 which causes the inclined face of member 97 to slip over the inclined face of member 96 as the solenoid 99 biases member 97 upwardly against tension of spring 100, and as arm 79 reciprocates.

Member 80 on its next reciprocation from the dotted to the full line position of FIGURE 5 moves member 82 with it by frictional engagement of members 96 and 97. Thus closure members 93 will be swung from the position of FIGURE 2, to the position of FIGURE 3, opening aperture or slot 29 and the material F will fall down to the bunk in one elongated mass or stream. Since the falling of the material will allow the tension of spring 121 to move member 115 from the dotted to the full line position of FIGURE 7 the solenoid 99 will be de-activated, spring 100 allowed to bias member 97 in the position of FIGURE 4 and pitman 79 will once more slip on rod 81.

The operation of the modified form of switch S3 shown in FIGURES 9 and 10 is substantially identical except that pressure is exerted on the membrane 128 which will then move actuator 129 to close the switch with the same results. When pressure is released on the membrane 128 by the material F dropping away as the slot 29 is opened the switch S3 is de-activated.

When desired, switch S1 may be activated to continuously engage solenoid 99 for the requisite number of dumps to clear the feeder of all material regardless of whether feed is actuating switch S2 (or S3) or not.

If, in addition to the beneficial features provided by the dumping action of this invention, multiple lot feeding is desired the diverter boards 101 and divider boards 108 are installed. As will be apparent by FIGURE 2, by use of the handle 105 the boards 101 may be swung from the full to the dotted line position of FIGURE 2 and since they are positioned underneath slot 29 will divert material either leftwardly or rightwardly with reference to FIGURE 2, and animals may be fed at one side of the bunk or the other, as desirable.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A bunk feeder or the like comprising a hopper, a cooperating hood means extending from one end of said hopper, a helical auger positioned in said hopper and hood means and supported by the bottom thereof, motor means for actuating said helical auger, said hood means having an open elongated slot in the bottom, stands for supporting the foregoing, a horizontally swingable closure means swingable from a first position under said slot to a second position at one side thereof, means operable by said motor means for swinging said closure means from said first to said second position, said last named means including a first member slidable with relation to a second member, and means operable by the conveying of material by said conveyor for securing said first and second members in a relative fixed position to provide a drive connection for moving said closure means from first to second position.

2. A bunk feeder or the like comprising a conveyor means including bottom wall means forming an elongated slot for transporting materials, gate means for retaining material in said conveyor means and releasing material for movement through the elongated slot in said conveyor means, and drive means for operating the gate means for movement relative to said elongated slot said latter means including pressure switch means for controlling said drive means for releasing material, said pressure switch means being positioned at a point substantially adjacent the distal end of the conveyor means so as to be engaged by material being conveyed for controlling the release thereof.

3. A bunk feeder for depositing material in a feed bunk comprising in combination, conveying means for transporting material in extended position with respect to the feed bunk, support means for supporting said conveying means in vertical spaced relationship above the bottom of the feed bunk; said conveying means including a rotatable auger, first wall means having a bottom portion terminating in a linear edge, said auger positioned along said bottom portion for discharging material over said edge, and second wall means laterally spaced from said edge forming therewith an elongated opening; gate means positioned to open and close said elongated opening, arm means pivotally mounting the gate means on the support means to swing the gate means in a plane into a first position to close said elongated opening and to swing said gate means in the same plane into a second position to open said elongated opening, and means for swinging said gate means from said first to second position for releasing material through said slot and for swinging said gate means from said second to said first position to close said elongated opening.

4. A bunk feeder for depositing material in a feed bunk comprising in combination, conveying means for transporting material in extended position with respect to the feed bunk, support means for supporting said conveying means in vertical spaced relationship above the bottom of the feed bunk; said conveying means including a rotatable auger and wall means having a bottom portion terminating in a linear edge, said auger positioned along said bottom portion for discharging material over said edge, a gate member positioned adjacent said edge, arm means pivotally mounting the gate member on the support means to swing the gate member in a plane into a first position to retain material in said conveying means and to swing said gate member in the same plane into a second position to dump the material in said conveying means into the feed bunk, said arm means pivotally mounting the gate means on the support means for horizontally swinging movement between said first position and said second position, and control means for swinging said gate means from said first position to said second position and from the second position to the first position.

5. A bunk feeder for depositing material in a feed bunk comprising in combination, conveying means for transporting material in extended position with respect to the feed bunk, support means for supporting said conveying means in vertical spaced relationship above the bottom of the feed bunk; said conveying means including a movable member, first stationary wall means having a bottom portion terminating in a linear edge, said movable member extended along said first wall means and bottom portion and operable to carry material along said bottom portion, and second stationary wall means laterally spaced from said edge forming therewith at least one elongated opening; gate means positioned to close and open said elongated opening, means mounting the gate means for movement of the gate means about a plurality of upright axes for swinging said gate means in a plane to a first position to close said elongated opening and to swing said gate means in the same plane to a second position to open said elongated opening, and control means for moving said gate means from said first position to the second position for releasing material through said elongated opening and for moving said gate means from said second position to said first position to close said elongated opening.

6. A bunk feeder or the like having a conveyor means and housing means surrounding at least the lower portion of the conveyor means, swingable closure means for intermittently containing material in and releasing material from the housing means, said closure means being swingable in a single plane in both the material containing and releasing position by an extendable and contractable pitman arm means connected to said closure means, and actuator means connected to said pitman arm means and responsive to the amount of material in said conveyor means for retaining the pitman arm means in contracted position for operation of the closure means.

7. A bunk feeder or the like having a conveyor means and means for intermittently containing and releasing material, a swingable closure means, said closure means being swingable in a horizontal plane by an extendable and contractable pitman arm means connected to said closure means, control means connected to said pitman arm means for retaining the pitman arm means in contracted position for operation of the closure means, and solenoid means responsive to the amount of material in said conveyor means for actuating said control means for retaining said pitman arm means in contracted position.

8. A bunk feeder assembly for depositing material in a feed bunk comprising means for conveying material in extended linear relation with respect to the feed bunk, means for supporting said aforesaid means in vertical spaced relation with respect to the bottom of the feed bunk, said means for conveying material including a stationary bottom wall having a substantially continuous elongated slot extended along the entire length of the lower portion of the bottom wall, movable closure means positioned below and adjacent said bottom wall for opening and closing said elongated slot, means mounting the closure means for movement of the closure means about a plurality of upright axes for swinging said closure means between open and closed positions in the same substantially horizontal plane, and control means operable to swing said closure means to the open position for releasing a substantial portion of the material carried by said conveying means through said elongated slot along the entire length of the bunk feeder.

9. The bunk feeder assembly of claim 8 further characterized by means responsive to the amount of material in said extended linear relation for actuating said control means for intermittently opening said closure means.

10. The bunk feeder assembly of claim 8 wherein said control means includes means for intermittently swinging the closure means to the open position.

11. A bunk feeder comprising in combination, a conveying means for transporting material into extended position, support means secured to said conveying means supporting said conveying means in a predetermined position, said conveying means including a material conveying unit and stationary housing means positioned about at least the lower portion of the conveying unit, said housing means including a bottom portion having at least one discharge opening along the length thereof providing a passage for movement of material transported by said conveying unit from said housing means, movable closure means positioned adjacent said housing means for opening and closing said discharge opening, means supporting the closure means for movement of the closure means about a plurality of upright axes for swinging said closure means between open and closed positions in substantially the same plane, and control means operable to swing said closure means to the open position for releasing material through said discharge opening.

12. The apparatus according to claim 11 wherein said housing means comprises a first elongated substantially vertical wall portion, a second elongated top closure portion joined to the top edge of said vertical wall portion, a third elongated wall portion having an arcuate cross section positioned to have an edge in spaced relation to said first portion.

13. The apparatus according to claim 11 wherein said housing means includes an elongated reversible wear plate, said wear plate having an arcuate cross section and connection means at both longitudinal edges thereof whereby said wear plate may be connected selectively in initial or end-for-end reverse position.

14. The structure of claim 13 further characterized in that said conveying unit includes spaced arcuate peripheral portions of given radius and is adapted for turning in a given direction about its axis so that points on said spaced arcuate portions turn to pass in a direction from said top portion to said third portion.

15. The structure of claim 13 further characterized in that the radius of said third elongated portion is greater than the radius of said conveying unit, and said conveying unit is supported in eccentric relation to said second top closure portion by said third elongated portion.

16. The apparatus according to claim 11 wherein said support means includes a plurality of stands for supporting said conveying means from the surface of a bunk or the like, said stands each having a pair of spaced vertical legs and means whereby said conveying means may be vertically adjusted with respect thereto.

17. The structure according to claim 13 further characterized by a substantially vertical wall portion against which said closure means abuts when in closed position.

18. The apparatus according to claim 11 wherein said conveying means is supported by a plurality of stands including a plurality of vertically extending legs, a dump means pivotally supporting said closure means on said stands and a diverter board means also supported by said stands below the discharge opening in the housing means.

19. The apparatus according to claim 11 including a hopper for collecting material at one end thereof supported by a plurality of stands, each stand having a pair of vertical legs, a motor for driving said conveying means, supported upon slidable bracket means on one of said stands, said bracket means comprising a spaced pair of horizontal members retained in spaced position by attachment to said motor, a hopper vertically adjustable on said legs, threaded means for retaining said motor bracket members in adjusted vertical relation with respect to said hopper, and second threaded means for retaining said hopper in vertically adjusted position with respect to said stands.

20. The apparatus according to claim 11 including a diverter board assembly including a first vertically positioned member secured beneath said conveyor means, a tiltable member positioned on top of and secured to said first member and control means for tilting said member.

21. The apparatus according to claim 11 wherein said housing means comprises a plurality of substantially tubular hood sections each composed of a plurality of sheet members and joined together by cooperating flanges, each of said flanges having a portion removed adjacent the end of the tubular section for cooperating with a reinforcing and supporting plate of substantially identical configuration as said tubular section, and each of said plates being adapted to be positioned to overlap abutting ends of adjacent abutting tubular hood sections.

22. The apparatus according to claim 11 wherein said housing means comprises a plurality of substantially tubular hood sections, each of said tubular sections having an arcuate top portion, plate means secured to the tubular sections, arcuate stand portions for supporting said tubular sections and said plate means being supported on threaded rod means adjustable vertically with respect to said arcuate top portions.

23. A bunk feeder for depositing material in a fed bunk or the like comprising in combination conveying means for transporting material in extended linear relation with respect to the feed bunk, support means connected to said conveying means for supporting said conveying means in vertical spaced relationship from the bottom of the feed bunk, said conveyor means including first wall means having a bottom portion terminating in a linear edge and second wall means spaced from the linear edge forming therewith an elongated discharge opening extended substantially the entire length of the conveying means, closure means for said discharge opening, said closure means extended along the length of and laterally movable with respect to the conveying means to open and closed positions, means mounting said closure means for lateral movement with respect to the conveying means, control means responsive to the amount of material in said conveying means for moving said closure means between said open and closed positions for controlling the flow of material through said discharge opening, drive means for moving said closure means to open and closed positions with respect to said discharge opening, said drive means responsive to said control means and secured to said closure means, said closure means alternately closing said discharge opening and releasing feed along the length of said conveying means when driven by said drive means in response to said control means.

24. A bunk feeder assembly comprising a feed conveyor means of substantial longitudinal extension, housing means adjacent said feed conveyor means for supporting conveyed feed, said housing means including a stationary bottom wall portion, a side wall portion spaced from the bottom wall portion forming an elongated slot, and a movable portion engaging said side wall to close said slot, said portion movable from said side wall to open said slot, means mounting said movable portion for lateral movement in a plane with respect to said side wall, drive means for moving said movable portion relative to said side wall in said plane to alternatively support and release material conveyed in the longitudinal extension, and control means responsive to the material conveyed by said conveyor means for actuating said drive means whereby the movable portion moves from the stationary side wall opening the elongated slot.

25. The structure of claim 24 in which said means for supporting conveyed feed comprises a bottom wall portion and a side wall portion providing a reservoir spaced from said conveyor means at a portion of its periphery when said movable portion for supporting conveyed feed is in supporting position.

26. A bunk feeder for depositing material in a feed bunk comprising in combination, conveying means for transporting material in extended position with respect to the feed bunk, said conveying means including a movable member, stationary first wall means having a bottom wall terminating in a linear edge, said movable member positioned along said bottom wall for discharging material over said edge, and a second stationary wall laterally spaced from said edge forming therewith an elongated opening, gate means positioned to open and close said elongated opening, arm means pivotally mounting the gate means for movement about a plurality of upright axes for swinging said gate means in a horizontal plane to a first position to close said elongated opening and to swing said gate means in the same horizontal plane to a second position to open said elongated opening, and means for swinging said gate means from said first position to the second position for releasing material through said slot.

27. A bunk feeder for depositing material in a feed bunk comprising in combination, conveying means for transporting material in extended position with respect to the feed bunk, said conveying means including a movable member, and sationary wall means having a bottom portion terminating in a linear edge and providing an elongated opening, said movable member positioned along said bottom portion for discharging material over said edge, gate means positoned to open and close said elongated opening, arm means pivotally mounting the gate means for movement about a plurality of upright axes for swinging said gate means in a plane to a first position to close said elongated opening and to swing said gate means in the same plane to a second position to open said elongated opening, and means for swinging said gate means from said first position to the second position for releasing material from said bunk feeder into the feed bunk.

28. A bunk feeder for depositing material on a feed surface comprising in combination, conveying means for transporting material in extended position with respect to the feed surface, said conveying means including a rotatable auger, first stationary wall means having a concave curved bottom portion terminating in at least one linear edge, and upright wall means laterally spaced from said linear edge, defining a reservoir space at one side of said auger, said auger positioned along said bottom portion for discharging material over said edge into said reservoir space, gate means movably positioned adjacent said reservoir space to open and to close said reservoir space, means mounting the gate means for movement of the gate means in a plane to a first position to close said reservoir space and for movement in the same plane to a second position to open said reservoir space, and means for moving said gate means from said first position to the second position for releasing the material stored in said reservoir space onto the feeding surface.

29. A bunk feeder for depositing material on a feed surface comprising in combination, conveying means for transporting material in extended position with respect to the feed surface, said conveying means including a movable member, first stationary wall means having a bottom portion terminating in at least one linear edge, said movable member positioned along said bottom portion of the first wall means, and second stationary wall means facing and laterally spaced from said linear edge defining a reservoir space at one side of said movable member, said movable member operable to discharge material into the reservoir space along the length thereof, gate means movably positioned adjacent said reservoir space to open and to close said reservoir space, means mounting the gate means for movement of the gate means in a plane to a first position to close said reservoir space and for movement in the same plane to a second position to open said reservoir space, and means for moving said gate means from said first position to the second position for releasing the material stored in said reservoir space onto the feed surface.

30. A bunk feeder for depositing material on a feed surface comprising in combination, conveying means for transporting material in extended position with respect to the feed surface, said conveying means including a movable member, first stationary wall means having a bottom portion terminating in at least one linear edge, said movable member positioned along said bottom portion of the first wall means, and second stationary wall means facing and laterally spaced from said linear edge defining a reservoir space at one side of said movable member, said movable member operable to discharge material into the reservoir space along the length thereof, gate means positioned for movement in a single plane adjacent said reservoir space to selectively open and close said reservoir space, and control means for moving said gate means from the closed position to the open position for releasing the material stored in said reservoir space onto the feed surface.

31. A feeding system for periodically supplying feed to a feeding location comprising means for collecting and storing a supply of feed, a feed dispensing means supported adjacent to and at a higher elevation than said feeding location, said feed dispensing means including a housing defining a feed storing chamber, gate means mounted for movement in a common plane to first and second positions for opening and closing the bottom of said feed storing chamber, conveyor means having a portion disposed in said feed dispensing means to move feed from said feed storing means to fill the feed storage chamber, means for moving said gate means in said plane to the first position thereby opening the bottom of said feed storing chamber to discharge feed into the feeding location, and control means responsive to the amount of feed in said conveyor means for actuating said gate moving means to move the gate means to the first position.

32. In a bunk feeder or the like having a plurality of supporting stands providing a plurality of vertically extending legs and housing means formed with an elongated opening supported by said stands adjacent said legs, the improvement comprising a closure plate means pivotally supported to open and close said elongated opening, means pivotally mounting said plate means on a plurality of corresponding legs of said stands for movement in a single plane to open and closed positions with respect to said elongated opening, said plate means providing an elongated extension, and means for swinging said plate means in said plane from the open position adjacent said legs to the closed position.

33. The structure of claim 32 further characterized by a depending wall means against which said closure plate means abuts when in the closed position.

34. In a bunk feeder including support means and housing means formed with an elongated opening, the improvement comprising gate means positioned to open and close said elongated opening, arm means pivotally mounting the gate means for movement of the gate means about a plurality of axes on the support means to swing in a single plane to a first position adjacent said elongated opening to close said elongated opening and to swing in the same plane to a second position away from said elongated opening to open said elongated opening, and means for swinging said gate means to and from said first and second positions.

35. In a bunk feeder including support means and housing means formed with an elongated opening, the improvement comprising gate means positioned to open and close said elongated opening, arm means pivotally mounting the gate means for movement of the gate means about a plurality of axes on the support means to swing in a single plane to a first position adjacent said elongated opening to close said elongated opening and to swing in the same plane to a second position away from said elongated opening to open said elongated opening, wall means adjacent one side of said opening, said gate means when in the first position abuts said wall means, and means for swinging said gate means to and from said first and second positions.

36. In a bunk feeder the improvement comprising first wall means having a bottom portion terminating in at least one linear edge, second wall means spaced from said edge forming therewith at least one discharge opening, gate means movably located in a closed position below said discharge opening to close said discharge opening and movable to an open position away from said opening to an open position to open said discharge opening, and a plurality of arm means pivotally mounting the gate means for movement of the gate means about a plurality of axes for movement in a single plane between the open and closed positions of the gate means to open and close the elongated opening.

37. The bunk feeder structure according to claim 36 further characterized by said second wall means including a portion which said gate means abuts when the elongated opening is closed by the gate means.

38. In a bunk feeder the improvement comprising conveyor means including wall means having a bottom portion terminating in a linear edge, gate means movably located in a first position adjacent said edge and movable to a second position away from said edge, and a plurality of arm means pivotally mounting the gate means for movement of the gate means about a plurality of axes for swinging movement in a single plane to the first position to retain material in said conveyor means and for swinging movement in the same plane to the second position to dump substantially all of the material in said conveyor means.

References Cited by the Examiner

UNITED STATES PATENTS

| | | | |
|---|---|---|---|
| 2,069,350 | 2/1937 | Blue | 222—561 |
| 2,592,480 | 4/1952 | Slocum | 198—233 X |
| 2,715,887 | 8/1955 | Flannery | 119—52 |
| 2,718,296 | 9/1955 | Johnson | 198—204 |
| 2,746,656 | 5/1956 | Bradshaw | 222—561 |
| 2,803,334 | 8/1957 | Kitson | 198—204 |
| 2,867,314 | 1/1959 | Hansen | 198—64 |
| 2,940,639 | 6/1960 | Winter | 222—412 X |
| 2,955,702 | 10/1960 | Long et al. | 198—204 |
| 2,961,126 | 11/1960 | Craig | 222—14 |
| 3,029,791 | 4/1962 | Hacker | 119—52 |
| 3,029,925 | 4/1962 | Martin et al. | 198—64 |
| 3,037,611 | 6/1962 | Majorowicz | 198—64 |
| 3,050,176 | 8/1962 | Brelsford | 198—64 |
| 3,105,586 | 10/1963 | Carew et al. | 119—52 X |
| 3,115,117 | 12/1963 | Brelsford | 119—52 X |
| 3,133,625 | 5/1964 | Best | 119—52 X |

RAPHAEL M. LUPO, *Primary Examiner.*

CHARLES W. ROBINSON, EVERETT W. KIRBY, *Examiners.*

H. R. CHAMBLEE, N. L. STACK, *Assistant Examiners.*